United States Patent [19]
Hunckler

[11] 3,877,502
[45] Apr. 15, 1975

[54] NUT LOCKING MEANS AND METHOD FOR MUFFLER CLAMPS

[75] Inventor: Paul J. Hunckler, Huntington, Ind.

[73] Assignee: Hunckler Products, Inc., Huntington, Ind.

[22] Filed: Aug. 29, 1973

[21] Appl. No.: 392,658

[52] U.S. Cl. ................... 151/20; 24/277; 151/35
[51] Int. Cl. ............................................ F16b 39/24
[58] Field of Search ............... 151/20, 34, 35, 41.5; 24/277, 284, 135 M

[56] References Cited
UNITED STATES PATENTS

| 240,387 | 4/1881 | Cowdy | 151/35 |
|---|---|---|---|
| 310,985 | 1/1885 | Campbell | 151/20 |
| 323,560 | 8/1885 | Burdick | 151/20 |
| 900,796 | 10/1908 | Tambling | 151/20 |
| 1,043,721 | 11/1912 | Prince | 151/34 |
| 1,387,085 | 8/1921 | Whippey | 151/20 |
| 3,126,934 | 3/1964 | Marx | 151/34 |
| 3,316,605 | 5/1967 | Tabbert | 24/277 |

FOREIGN PATENTS OR APPLICATIONS

| 268,681 | 4/1927 | United Kingdom | 151/35 |
|---|---|---|---|
| 501,432 | 3/1951 | Belgium | 151/20 |

*Primary Examiner*—Marion Parsons, Jr.
*Attorney, Agent, or Firm*—Woodard, Weikart, Emhardt & Naughton

[57] ABSTRACT

A flat circular washer is provided with a bulge on the nut facing surface thereof to impart a bind on the nut as it is tightened onto the bolt or stud passing through the washer, to lock the nut on the threads. Similarly, a muffler clamp is provided with bulges or humps on the nut facing surface thereof to tilt the nut and impose a binding action between the nut threads and the bolt threads, thus locking the nut in place.

3 Claims, 8 Drawing Figures

PATENTED APR 15 1975 3,877,502

NUT LOCKING MEANS AND METHOD FOR MUFFLER CLAMPS

BACKGROUND OF THE INVENTION

1. Field of the Invention

This invention relates generally to fasteners, and more particularly to threaded bolts and nuts, and locking means therefor.

2. Description of the Prior Art

Many nut-locking devices have been devised and are known in the art. Some are fairly elaborate and expensive, and others are simple, but still comparatively expensive. Also, where possible, it is desirable to avoid the necessity of using more than one part to lock a nut to a bolt, thus avoiding extra handling in assembly operations.

Some examples of prior art brought to light as a result of searching, are as follows:

| | | |
|---|---|---|
| 1,326,279 | MacLean | Dec. 30, 1919 |
| 1,631,819 | Ivory | June 7, 1927 |
| 2,180,773 | Simpson | Nov. 21, 1939 |
| 2,363,319 | Hanson | Nov. 21, 1944 |
| 2,570,863 | Rowe | Oct. 9, 1951 |
| 2,923,190 | Ingwer et al | Feb. 2, 1960 |
| 3,398,775 | Morin | Aug. 27, 1968 |

Of these patents, FIG. 3 of the Ingwer et al. patent discloses a washer having a "dimple" 39 thereon, somewhat similar to that of my lock washer, but for a different purpose. Specifically, the dimple 39 of the Ingwer washer or ring 37 is intended to be received in a recess 40 in the end of a portion of the pipe vise disclosed in that patent, and is not for the purpose of locking a nut on a bolt. It is intended to prevent rotation of the friction ring 37. Some of the other patents listed above show means for tilting a nut, but I believe that none of them are quite as simple and inexpensive as mine.

SUMMARY OF THE INVENTION

Described briefly, according to a typical embodiment of my invention, an apertured flat washer has a hump adjacent the aperture on one face thereof to impart a tilt and binding action on a nut engaging that face, with respect to a bolt extending through the washer. A further development of the invention provides humps adjacent apertures in saddle clamps for mufflers, and tail pipes and the like, to impose a tilt and therefor a binding action between the threads of a U-bolt and nuts securing the saddle clamp to the U-bolt.

DESCRIPTION OF THE PREFERRED EMBODIMENT

Figure 1:
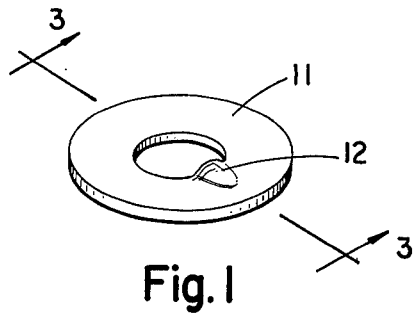
FIG. 1 is a perspective view of a circular apertured washer showing a typical embodiment of my invention.
Figure 2:
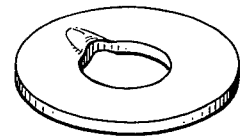
FIG. 2 is another perspective view thereof.
Figure 3:
FIG. 3 is a section therethrough taken at line 3—3 in FIG. 1 and viewed in the direction of the arrows.
Figure 5:
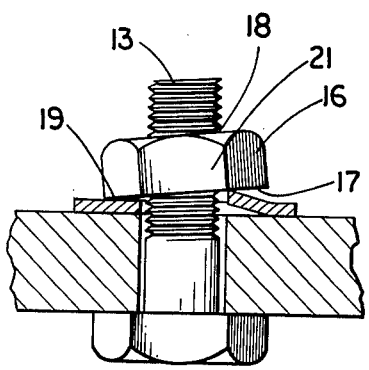
FIG. 5 is a section like FIG. 4 showing in exaggerated form the tilt imposed by the washer on the nut as it is tightened onto the bolt and washer assembly.
Figure 4:
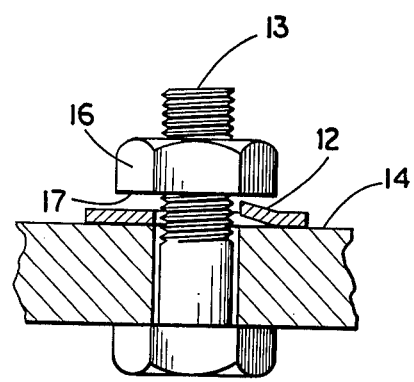
FIG. 4 is a section through an apertured plate receiving a bolt through the aperture, the washer on the bolt, and a nut in close proximity to the washer as it is threaded onto the bolt.

Referring now to the figures of the drawings, the washer 11 is a circular apertured wsher having a hump 12 formed therein as shown in these views. The washer is received over the end of a bolt 13 in the usual way and rests flat on the face 14 of a part of the assembly. The nut 16 threadedly received on the bolt has a lower face 17 facing the upper face of the washer. As the nut is tightened further onto the bolt 13, the lower face 17 thereof engages the upper extremity of the hump 12 to impose a tilt on the nut 16. Of course this tilt is exaggerated in the drawings. It imposes a locking action at the points 18, 19, and along the portions of the thread where the nut is being held up by the hump on the washer. These are indicated generally at 21. This provides the locking action desired.

Figure 6:
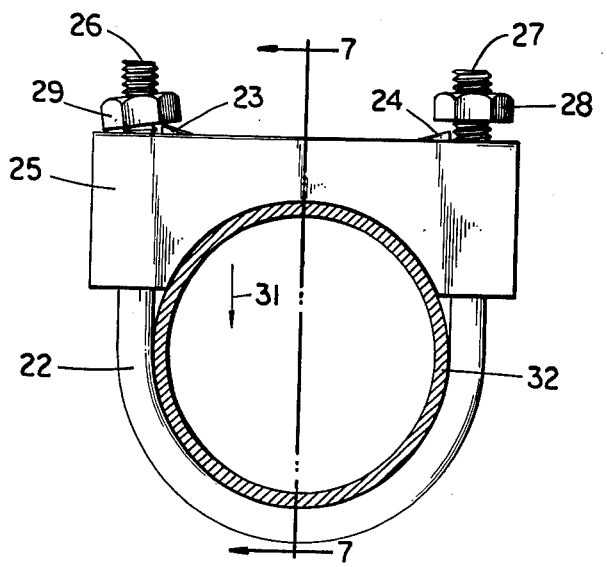
FIg. 6 is an elevational view of a saddle clamp assembly showing one nut partially threaded onto the U-bolt, and the other nut threaded far enough onto the U-bolt for the hump therein to impart the tilt on the nut to commence the locking action.

In the embodiment of FIG. 6, the saddle clamp 25 is provided with humps 23 and 24 immediately adjacent to apertures therein receiving the threaded portions 26 and 27, respectively, of the U-bolt 22. The nut 28 is shown partially threaded onto the U-bolt and the nut 29 is shown threaded sufficiently onto it to engage and be tilted by the hump 23. It should be assumed that there is resistance to further advance of the saddle clamp in the direction of arrow 31, as would be the case with an exhaust pipe 32 therein, for example, to thereby cause the nut to be tilted by the hump 23 as the saddle clamp, and therefore the hump thereon resists being moved in the direction of arrow 31.

Figure 7:
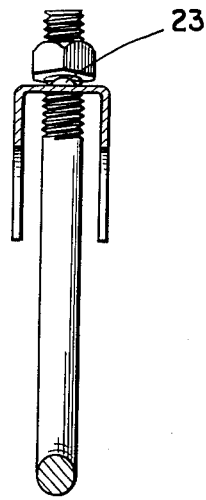
FIG. 7 is a section taken at line 7—7 in FIG. 6 and viewed in the direction of the arrows, but omitting the pipe.
Figure 8:
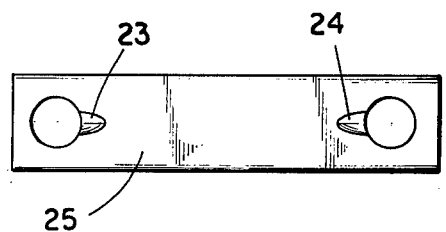
FIG. 8 is a view of the humped face of the saddle clamp itself.

FIG. 7 is a section showing the shape of the hump 23 to be essentially the same as in the washers of FIGS. 1 through 5. The pipe 32 is omitted from FIG. 7 to avoid confusion in the drawings.

While the invention has been disclosed and described in some detail in the drawings and foregoing description, they are to be considered as illustrative and not restrictive in character, as other modifications may readily suggest themselves to persons skilled in this art and within the broad scope of the invention.

The invention claimed is:

1. A nut locking combination comprising
an apertured member having upper and lower flat faces and a hump adjacent said aperture on one face thereof and extending only a portion of the circumference of the aperture through less than 90°;
a threaded fastener extending through said member;
a nut threadedly received on said fastener and engaging said first member, an inner portion of said nut, adjacent the thread on the fastener, engaging the upper face of said hump, engaging the flat surface of said member and thereupon imposing on said nut a tilted attitude with respect to said member and to said thread whereupon a binding action of said nut with respect to said thread and said member is obtained;

and said member being a saddle clamp having a pair of apertures therein horizontally spaced from each other and each of said apertures having one of said humps therein, the humps being on a line between the apertures and each of said apertures receiving a threaded end of a U-bolt therethrough, each threaded end receiving a nut thereon engageable by said hump to impose a tilting action on the nut with respect to the threaded portion of the bolt and the saddle clamp and thereby impose a binding action between the nut and the bolt and the saddle clamp.

2. A saddle clamp having a generally U-shaped cross section with a flat upper surface and a pair of horizontally spaced apertures in the upper surface thereof;

a hump at the outer edge of each of said apertures and projecting from the surface thereof in a direction opposite the open end of the "U," each said hump being positioned adjacent a location along the half of the perimeter of its associated aperture which is nearest the other said aperture.

3. The saddle clamp of claim 2 wherein:

said humps are located on a line extending between the apertures thereof and slope from maximum offsets with respect to the top face to a flush condition with respect thereto as they extend toward each other.

* * * * *